(12) United States Patent
Song et al.

(10) Patent No.: US 7,440,987 B1
(45) Date of Patent: Oct. 21, 2008

(54) 16 BIT QUADRATURE DIRECT DIGITAL FREQUENCY SYNTHESIZER USING INTERPOLATIVE ANGLE ROTATION

(75) Inventors: Yongchul Song, Seoul (KR); Beomsup Kim, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 658 days.

(21) Appl. No.: 10/373,469

(22) Filed: Feb. 25, 2003

(51) Int. Cl.
*G06F 1/02* (2006.01)
(52) U.S. Cl. ........................................ 708/276; 708/440
(58) Field of Classification Search .............. 708/276, 708/440, 272
See application file for complete search history.

(56) References Cited

U.S. PATENT DOCUMENTS

| | | | | |
|---|---|---|---|---|
| 4,718,030 | A | * | 1/1988 | Tsutsumi ..................... 708/276 |
| 4,893,316 | A | * | 1/1990 | Janc et al. .................... 708/300 |
| 5,737,253 | A | | 4/1998 | Madisetti et al. |
| 5,986,483 | A | | 11/1999 | Yu et al. |
| 5,999,581 | A | | 12/1999 | Bellaouar et al. |
| 6,640,237 | B1 | * | 10/2003 | Genrich ....................... 708/276 |

OTHER PUBLICATIONS

*A Technical Tutorial on Digital Signal Synthesis*, Analog Devices Inc., Norwood, MA, Copyright 1999, pp. 5-9.
"A 150-MHz Direct Digital Frequency Synthesizer in 1.25um, CMOS with -90-dBc Spurious Performance," Nicholas, et al., IEEE Journal of Solid-State Circuits, Dec. 1991, vol. 26, No. 12, pp. 1959-1969.
"A 100-MHz, 16-b, Direct Digital Frequency Synthesizer with a 100-dBc Spurious-Free Dynamic Range," Madisetti, et al., IEEE Jrnl. of Solid-State Circuits, Aug. 1999, vol. 34, No. 8, pp. 1034-1043.
"Low-Power Direct Digital Frequency Synthesis for Wireless Communications," Bellaouar, et al., IEEE Jrnl. of Solid-State Circuits, Mar. 2000, vol. 35, No. 3, pp. 385-390.

* cited by examiner

*Primary Examiner*—Chuong D Ngo
(74) *Attorney, Agent, or Firm*—Jonathan T. Velasco; Thomas R. Rouse

(57) ABSTRACT

A direct digital synthesizer employs a trigonometric function generator utilizing decomposition of a larger angle into smaller sub-angles, interpolation of a desired sub-angle between two known angles and calculating the trigonometric function using complex arithmetic. The direct digital synthesizer has a phase accumulator to generate an angular increment signal of the output signal. A trigonometric function generator in communication with the phase accumulator receives the angle signal and from the angle signal creates the trigonometric function signal. An angle decomposing circuit is connected to receive the angle signal to separate the angle signal into sub-angles of the angular increment, a sum of the sub-angles equaling the angular increment. An interpolation circuit receives the smallest of the sub-angles to generate the trigonometric function for the smallest of the sub-angles by interpolating between the trigonometric function of two known angles. The direct digital synthesizer has a first angle trigonometric retaining for retaining the trigonometric functions of the known angles. At least one second angle trigonometric retaining circuit retains the trigonometric functions of for the remaining sub-angles. A complex arithmetic unit combines the interpolated trigonometric function and the second trigonometric function from each of the second angle trigonometric retaining circuits to create the trigonometric function.

46 Claims, 5 Drawing Sheets

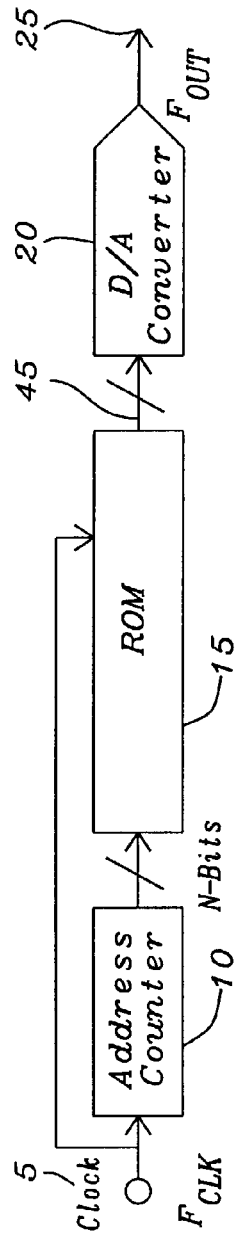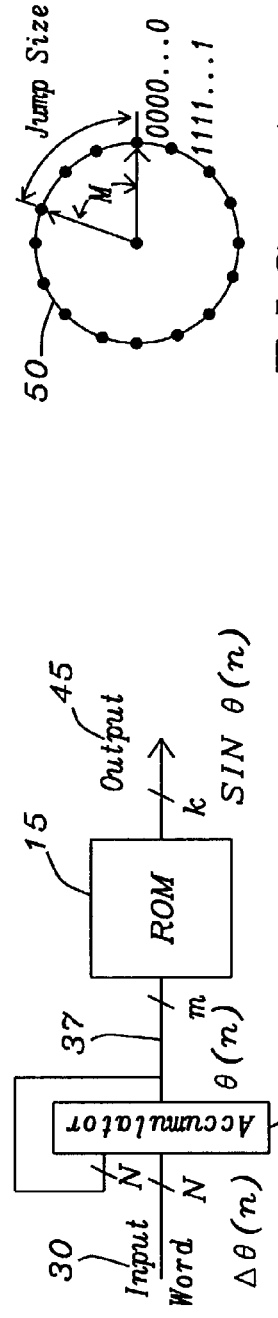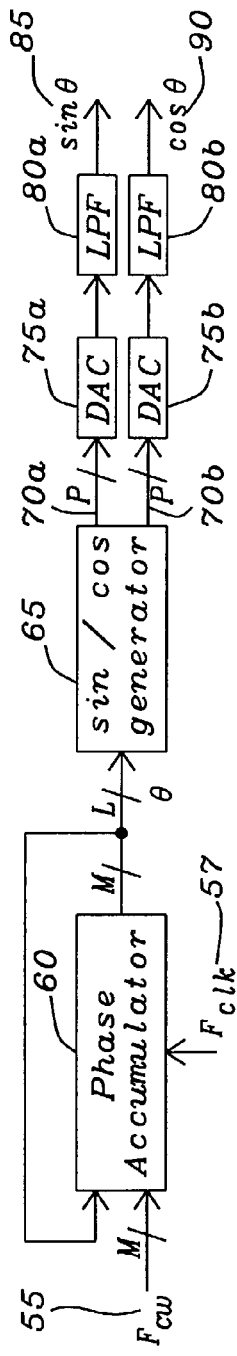
FIG. 1a – Prior Art
FIG. 1b – Prior Art
FIG. 1c – Prior Art
FIG. 1d – Prior Art

16 BIT QUADRATURE DIRECT DIGITAL FREQUENCY SYNTHESIZER USING INTERPOLATIVE ANGLE ROTATION

BACKGROUND OF THE INVENTION

1. Field of the Invention

This invention relates to methods and apparatus for direct digital frequency synthesis. More particularly this invention relates to methods and apparatus for direct digital frequency synthesis employing interpolation of trigonometric functions of angles between the trigonometric function of known angles.

2. Description of Related Art

As is described in *A Technical Tutorial on Digital Signal Synthesis*, Analog Devices, Norwood, Mass., 199, pp. 5-9, and shown in FIG. 1a, a direct digital synthesizer in its simplest form is implemented from a precision reference clock 5, an address counter 10, a read only memory (ROM) 15, and a digital-to-converter 20. The digital amplitude information that corresponds to a complete cycle of a sine wave is stored in the ROM 15 as a table of sine functions with the addresses of the ROM 15 acting as the angular values of the sine contents of the table. The address counter 10 steps through and accesses each of the ROM's 15 memory locations and the contents (the equivalent sine amplitude words) are presented to the digital-to-analog converter 20. The digital-to-analog converter 20 generates an output frequency Fout 25 that is an analog sine wave in response to the sequence digital input words from the ROM 15.

The output frequency Fout 25 of this direct implementation is dependent on the frequency of the reference clock Fclk 5 and the number of increments of the angular values of the sine function as stored in the ROM 15. While the analog output fidelity, jitter, and AC performance of this simplistic architecture can be quite good, it lacks tuning flexibility. The output frequency Fout 25 can only be changed by changing the frequency of the reference clock Fclk 5 or by reprogramming the ROM 15. Neither of these options support high-speed output frequency hopping such as used in spread spectrum modulation techniques of wireless radio frequency transmission.

With the introduction of a phase accumulator 35 as shown in FIG. 1b, this architecture becomes a numerically controlled oscillator, which is the core of a highly flexible direct digital synthesis device. The phase accumulator 35 is a variable-modulus counter and phase register is implemented in the circuit before ROM 15, as a replacement for the address counter 10. The input word 30 provides a phase angle increment indicating the number of reference clock Fclk 5 pulses needed to construct the output frequency Fout 25. The phase accumulator 35 provides the phase angle 37 that addresses the ROM 15. The ROM 15 then provides the sine amplitude values 45 for the phase angles indicated by the phase accumulator 35.

Referring now to FIG. 1c to visualize the sine wave oscillation as a vector rotating around a unit circle 50. Each designated point on the unit circle 50 corresponds to the equivalent point on a cycle of a sine waveform. As the vector rotates around the circle 50, it is apparent that a corresponding output sine wave is being generated. One revolution of the vector around the unit circle 50, at a constant speed, results in one complete cycle of the output sine wave. The phase accumulator 35 is utilized to provide the equivalent of the vector's linear rotation around the unit circle 50. The contents of the phase accumulator 15 correspond to the points on the cycle of the output sine wave. The number of discrete phase points contained in the unit circle 50 is determined by the resolution of the input control word 30, of the phase accumulator 35. The output of the phase accumulator 35 is linear and cannot directly be used to generate a sine wave or any other waveform except a ramp. Therefore, the ROM 15 acts as a phase-to-amplitude lookup table to convert a truncated version of the phase accumulator's 15 instantaneous output value into the sine wave amplitude information that is presented to the digital-to-analog converter 20.

The phase accumulator 35 is actually a modulus M counter that increments its stored number each time it receives a clock pulse. The magnitude of the increment is determined by a digital input word 30 that is summed with the counter. The input word 30 forms the phase step size between reference clock updates; it effectively sets how many points to skip around the unit circle. The larger the increment size, the faster the phase accumulator overflows and completes its equivalent of a sine wave cycle. For example, an N=32-bit phase accumulator, an M value of 0000 . . . 0001 (one) would result in the phase accumulator overflowing after $2^{32}$ reference clock cycles (increments). If the M value is changed to 0111 . . . 1111, the phase accumulator will overflow after only $2^1$ clock cycles, or two reference clock cycles. This control of the jump size constitutes the frequency tuning resolution of the direct digital synthesizer architecture. The relationship of the phase accumulator 35 and the input word 30 form the basic tuning equation for direct digital synthesizer architecture:

$$F_{OUT}=(M(F_{CLK}))/2^N$$

Where:
$F_{OUT}$=the output frequency of the direct digital synthesizer
M=the binary tuning word
$F_{clk}$=the internal reference clock frequency (system clock)
N=The length in bits of the phase accumulator Changes to the value of M in the direct digital synthesizer architecture result in immediate and phase-continuous changes in the output frequency.

Referring now to FIG. 1d for a description of a direct digital frequency synthesizer of the prior art. The frequency control word 55 provides the phase increment to the phase accumulator 60 to provide the phase modulus of the reference clock Fclk 57 in the generation of the output frequency. The phase accumulator 60 is the modulus M counter used to increment the sine/cosine generator 65. In the description above the sine-cosine generator 65 is the ROM 15 that provides the amplitudes of the sine and/or cosine of the phase angles provided by the phase accumulator 65. The output amplitudes of the sine/cosine generator 70a and 70b are the inputs to the digital-to-analog converters 75a and 75b which creates the quadrature output sine and cosine signals that are the inputs to the low pass filters 80a and 80b. The low pass filters respectively remove any noise components of the quadrature output sine and cosine signals to form the output signals 90a and 90b.

As the resolution of the frequency adjustment improves, the frequency control word 55 becomes has more binary digits. This increases the address space of the sine/cosine generator 65 as implemented in the ROM 15. Thus as the frequency control word increase in size linearly, the size of the ROM 15 must increase exponentially. To compensate for this, the prior art employs a method to minimize the size of the ROM 15 by exploiting the symmetrical nature of a sine wave and utilize mapping logic to synthesize a complete sine wave cycle from ¼ cycle of data from the phase accumulator 65. The phase-to-amplitude lookup table generates all the necessary data by reading forward then back through the lookup table.

"A 150-Mhz Direct Digital Frequency Synthesizer in 1.25 μM CMOS With −90-Dbc Spurious Performance, Nicholas, et al. IEEE Journal of Solid-State Circuits, December 1991 Volume: 26 Issue: 12, pp. 1959-1969, presents a monolithic CMOS direct digital frequency synthesizer (DDFS), which simultaneously achieves high spectral purity and wide bandwidth. The direct digital frequency synthesizer uses an efficient look-up table method for calculating the sine function and reduces ROM storage requirements by a factor of 128:1.

"A 100-Mhz, 16-B, Direct Digital Frequency Synthesizer with a 100-Dbc Spurious-Free Dynamic Range," Madisetti, et al., IEEE Journal of Solid-State Circuits, August 1999, Volume: 34 Issue: 8, pp. 1034-1043, describes the architecture and implementation of a direct digital frequency synthesizer (DDFS) that is based on an angle rotation algorithm employing a technique similar to coordinate rotational digital computation (CORDIC). The architecture is implemented as a multiplierless, feedforward, and easily pipelineable datapath.

"Low-Power Direct Digital Frequency Synthesis for Wireless Communications," Bellaouar, et al. IEEE Journal of Solid-State Circuits, March 2000, Volume: 35 Issue: 3, pp. 385-390 discusses a low-power direct digital frequency synthesizer (DDFS) architecture. It uses a smaller lookup table for sine and cosine functions compared to systems of the prior art with a minimum additional hardware. Only 16 points are stored in the internal memory implemented in ROM (read-only memory). The full computation of the generated sine and cosine is based on the linear interpolation between the sample points.

U.S. Pat. No. 5,999,581 (Bellaouar, et al.) describes a direct digital frequency synthesizer for generating a digital sine or cosine function waveform from a received digital input signal. A memory stores digital samples along portions of sine and cosine function waveforms. The memory outputs the digital samples in response to a first portion of the digital input. Control logic is responsive to the digital input and controls the output of the digital samples from the memory to allow digital samples along a complete cycle of the sine or cosine function waveform to be output even though only portions of the sine and cosine function waveforms are stored in the memory. A linear interpolator receives a second portion of the digital input and modifies the digital sample output by the memory to generate intermediate digital samples between the digital samples stored in the memory to improve accuracy.

U.S. Pat. No. 5,986,483 (Yu, et al.) teaches a direct digital frequency synthesizer outputting a sine signal. The direct digital frequency synthesizer includes an accumulator, a symmetry circuit, a coarse circuit, a fine circuit and a sign circuit. The accumulator sequentially outputs a sample address according to a frequency control signal. The symmetry circuit takes the complement of the sample address to obtain a symmetric sample address represented by N bits. The coarse circuit connected to the symmetry circuit outputs the first M most-significant-bits of the symmetric sample address as the first M most-significant-bits of the sine signal. The fine circuit predicts the last N-M least-significant-bits of the sine signal from the last N-M least-significant-bits of the symmetric sample address according to the first M most-significant-bits of the symmetric sample address of the coarse circuit. Then, the sign circuit outputs a sign bit of the sine signal.

U.S. Pat. No. 5,737,253 (Madisetti, et al.) describes a direct digital frequency synthesizer with a phase accumulator provides a normalized angle θ to a sine/cosine generator that outputs the value of the sine/cosine function at the provided angle. The sine/cosine generator in a preferred embodiment comprises a plurality of multiplierless butterfly and carry-save stages in cascade that perform angle rotations on a phasor on the unit circle whose x and y coordinates correspond to cosine and sine values.

SUMMARY OF THE INVENTION

An object of this invention is to provide a function generator that creates an output signal representing a trigonometric function in response to an input singal representing an angle. The trigonometric function such as a sine or cosine is created employing interpolation of the trigonometric function between two known angles.

Another object of this invention is to provide a function generator that creates an output signal representing a trigonometric function in response to an input signal representing an angle. The trigonometric such as a sine or cosine is created by calculating the trigonometric function employing complex arithmetic to combine the trigonometric function for smaller sub-angles of the angle represented by the input angle.

Further, another object of this invention is to provide a direct digital synthesizer employing a trigonometric function generator utilizing interpolation of a desired angle between two known angles and decomposition of a larger angle into smaller sub-angles and calculating the trigonometric function from the smaller sub-angles using complex arithmetic.

To accomplish at least one of these objects and other objects, a direct digital synthesizer generates at least one output signal, each output signal representing one of a plurality of trigonometric functions in response to an input signal indicating a frequency of the output signal. The direct digital synthesizer has a phase accumulator connected to receive the input signal and a timing signal to generate an angular increment signal of the output signal. The angle signal being incremented by the input signal at each occurrence of the timing signal. The direct digital synthesizer, further, includes a trigonometric function generator in communication with the phase accumulator to receive the angle signal and from the angle signal creates at least one trigonometric function signal. Each trigonometric function signal represents one of the trigonometric functions.

The trigonometric function generator has an angle decomposing circuit connected to receive the angle signal to separate the angle signal into a plurality of decomposition signals representing sub-angles of the angular increment, a sum of the sub-angles equaling the angular increment. An interpolation circuit in communication with the angle decomposing circuit receives one of the decomposition signals representing a smallest of the sub-angles. The interpolation circuit generates the trigonometric function signals representing the plurality of trigonometric functions for the smallest of the sub-angles by interpolating between the trigonometric functions of two known angles.

The interpolation circuit includes a fractional angle calculator. The fractional angle calculator creates a fraction signal representing a fraction of the interval between two known angles where the smallest of the sub-angles of the decomposed angle resides. A difference calculator is connected to receive the trigonometric function signal for the two known angles to create a difference signal representing a difference for each trigonometric function of each of the two known angles. A multiplier circuit receives the difference signal and the fraction signal to create a product signal that is the multiplication of the difference signal and the fraction signal indicating a fractional portion of the trigonometric function of the smallest sub-angle in the interval of the two known angles. A summation circuit receives the trigonometric function signal of the least of the two known angles and the fraction signal to add the trigonometric signal of the least of the two known angles with the fraction signal to create the trigonometric function signal representing the trigonometric function for the smallest sub-angle.

The direct digital synthesizer has a first angle trigonometric retaining circuit in communication with the interpolation circuit and the angle decomposing circuit for retaining the trigonometric functions of the known angles. The first angle trigonometric retaining circuit communicates a first trigonometric function signal representing the trigonometric functions for the two known angles to the interpolation circuit. The angle decomposing circuit provides a first indicating signal selecting the two known angles. The two known angles being an adjacent larger known angle and an adjacent smaller known angle of the smallest sub-angle.

The direct digital frequency synthesizer also has at least one second angle trigonometric retaining circuit. Each of the second angle trigonometric retaining circuits is in communication with the angle decomposing circuit and retains the trigonometric functions of for one of the sub-angles. The second angle retaining circuit communicates a second trigonometric function signal representing the trigonometric functions for the sub-angle upon receipt of a second indicating signal from the angle decomposing circuit denoting the sub-angle.

A complex arithmetic unit combines the first trigonometric function signal and the second trigonometric function signal of each of the second angle trigonometric retaining circuits to create the trigonometric function signals. The complex arithmetic unit has a complex multiplier to multiply the first and second function signals to form said output trigonometric function signal representing the angle indicated by the angle signal from the phase accumulator.

The trigonometric function signal is transferred to a digital-to-analog converter to create the output signals. The output signals are filtered by a low pass filter to remove undesired noise signals from the output signal.

In the preferred embodiment of this invention the trigonometric functions are sine and cosine functions and the output signals represent the sine function and a cosine function of the angle represented by the input signal.

BRIEF DESCRIPTION OF THE DRAWINGS

FIGS. 1a and 1b are functional block diagrams of direct digital synthesizers of the prior art.

FIG. 1c is a plot of the unit circle illustrating the phase addressing structure of the direct digital synthesizers of the prior art.

FIG. 1d is a functional block diagram of the direct digital frequency synthesizer of the prior art.

DETAILED DESCRIPTION OF THE INVENTION

The direct digital frequency synthesizer of this invention has a trigonometric function generator that upon receipt of an input signal representing a phase angle provides an output signal representing at least one trigonometric function of the phase angle. The trigonometric function generator decomposes the phase angle into multiple sub-angles. One of the sub-angles indicating the quadrant of the unit circuit 50 of FIG. 1c. A second sub-angle is a coarse increment of a quadrant of the unit circuit 50 and a third sub-angle is a fine increment of the coarse increment. The phase angle is the sum of the sub-angles and a small differential between two of the third fine increments.

The trigonometric function generator determines the trigonometric function of the sub-angle of the coarse increment and then interpolates the trigonometric function between the trigonometric function of each of the two of the fine increments larger and smaller than smallest sub-angle of the decomposed phase angle. The trigonometric function generator then performs a complex arithmetic combination of the trigonometric function of the coarse sub-angle and the interpolated trigonometric function of the smallest sub-angle of the phase angle. The symmetry of the trigonometric functions allow the quadrant indication of the first sub-angle to permit either negation or interchange of dualistic trigonometric function to set the trigonometric functions of the second, third, and fourth quadrants of the unit circle.

Figure 2:
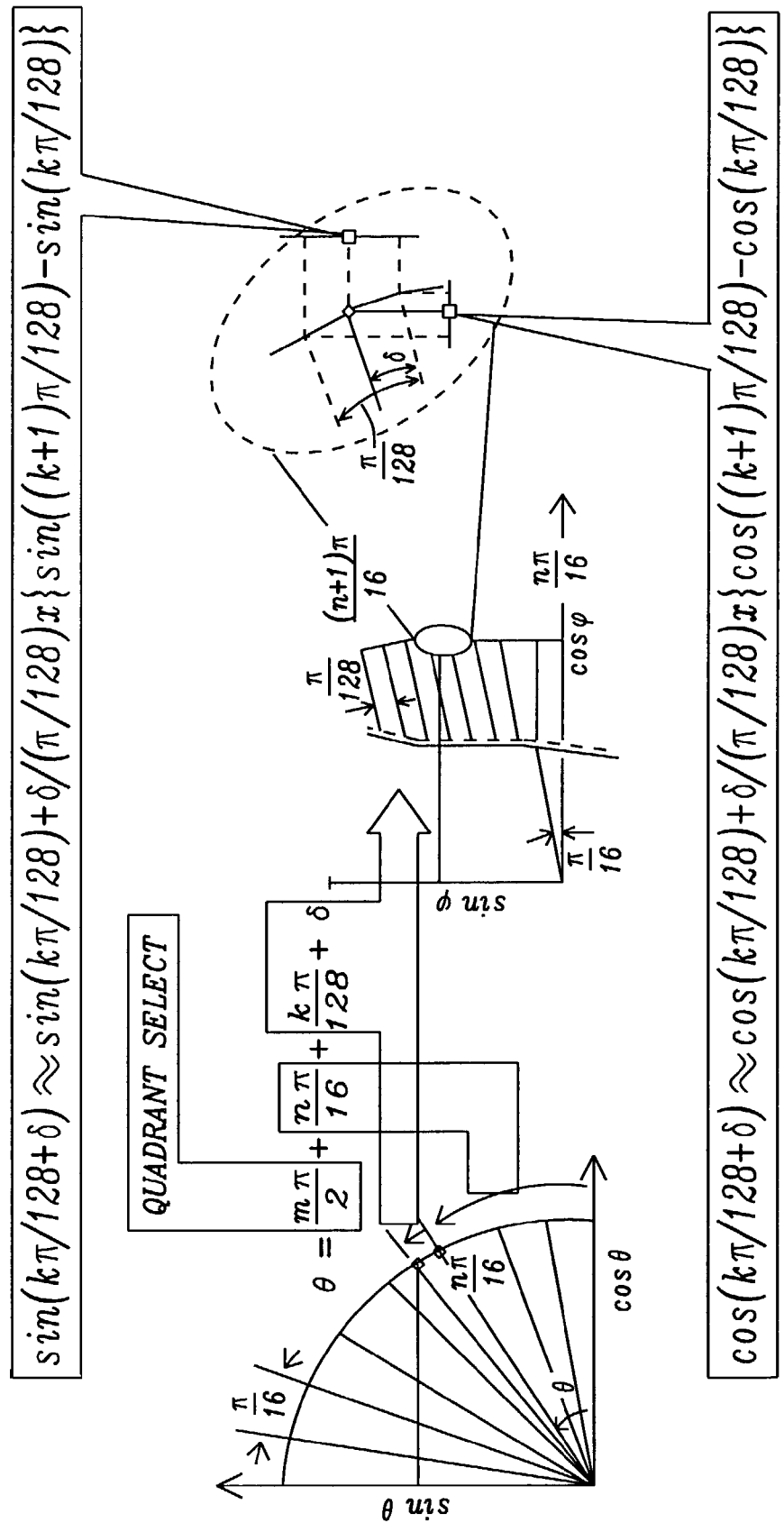
FIG. 2 is a diagram illustrating the decomposition of the phase angle and interpolation of the phase angle of this invention.

Refer to FIG. 2 for a more detailed discussion of the decomposition of the phase angle into the sub-angle and the interpolation of the smallest sub-angle. The phase angle θ is essentially divided by π/2 radians (90°) to determine the first sub-angle or the quadrant of the unit circle. The second sub-angle is determined by subtracting the quadrant multiplied by the by π/2 radians (90°) from the phase angle θ. The second sub-angle is then divided by a number of increments into which the first quadrant is divided to determine which increment of the coarse angle contains the second sub-angle. In the preferred embodiment the first quadrant is divided into eight increments therefore the second sub-angle is divided by π/16 (11.25°). The third sub-angle is then determined by subtracting the increment of the coarse sub-angle by the increment size π/16 (11.25°) from the second sub-angle. The coarse sub-angle is divided into a number of increments and the third sub-angle is divided by the number of increments of the coarse sub-angle. The third sub-angle being the sum of multiplication of the size of the increments of the third sub-angle and a small increment differential. In the preferred embodiment the coarse sub-angle is divided into eight increments or π/128 (1.4°). In summary, the decomposition of the phase angle θ is determined by the formula:

$$\theta = \alpha + \Phi + \varphi$$

where:

$$\alpha = \frac{m\pi}{2}$$

$$\phi = \frac{n\pi}{16}$$

$$\varphi = \frac{k\pi}{128} + \delta$$

m is the quadrant of the angle θ.

n is the increment of the coarse sub angle into which the first quadrant is divided.

k is the increment of the fine sub-angle into which the coarse sub-angle is divided.

δ is the differential remainder between the two fine sub-angles.

As is known, the phase angle θ on the unit as projected to the abscissa and the ordinate respectively provide the sine and cosine functions of the phase angle θ. Further, the trigonometric identities state that the sine and cosine of the sum of two angles can be determined by the complex multiplication of the coordinates of the abscissa and the ordinate of the projection of the two angles from the unit circle. Thus sine and the cosine of the sum of the coarse and fine angle are determined from the complex multiplication shown in the formula:

$$\cos(\Phi+\phi)+j\sin(\Phi+\phi)=(\cos(\Phi)+j\sin(\Phi))*(\cos(\phi)+j\sin(\phi))$$

thus $$\sin(\Phi+\phi)=(\cos(\Phi)*\sin(\Phi))+(\cos(\phi)*\sin(\phi))$$

$$\cos(\Phi+\phi)=(\cos(\Phi)*\cos(\Phi))-(\sin(\phi)*\sin(\phi))$$

The trigonometric functions (sine and cosine) of the smallest sub-angle φ are determined by interpolation of the trigonometric functions of the fine increment angle larger and the fine increment angle smaller that the smallest sub-angle φ. In "A Digital Signal Processing Approach to Interpolation," Schafer, et al., Proceedings of the IEEE, June 1973, vol. 61, pp. 692-702, describes use of classical linear and polynomial interpolation techniques for digital signal processing. In the preferred embodiment of this invention the interpolation of the smallest sub-angle φ uses linear interpolation, but it is in keeping with the intent of this invention to also employ polynomial interpolation to determine the trigonometric function of the smallest sub-angle φ. The interpolation of the sine and cosine of the smallest sub-angle φ is determined by the formulas:

$$\sin\varphi = \sin\left(\frac{k\pi}{128}+\delta\right) = \sin\left(\frac{k\pi}{128}\right) + \frac{\delta}{\pi/128}\left(\sin\left(\frac{(k+1)\pi}{128}\right) - \sin\left(\frac{k\pi}{128}\right)\right)$$

$$\cos\varphi = \cos\left(\frac{k\pi}{128}+\delta\right) = \cos\left(\frac{k\pi}{128}\right) + \frac{\delta}{\pi/128}\left(\cos\left(\frac{(k+1)\pi}{128}\right) - \cos\left(\frac{k\pi}{128}\right)\right)$$

Figure 3:
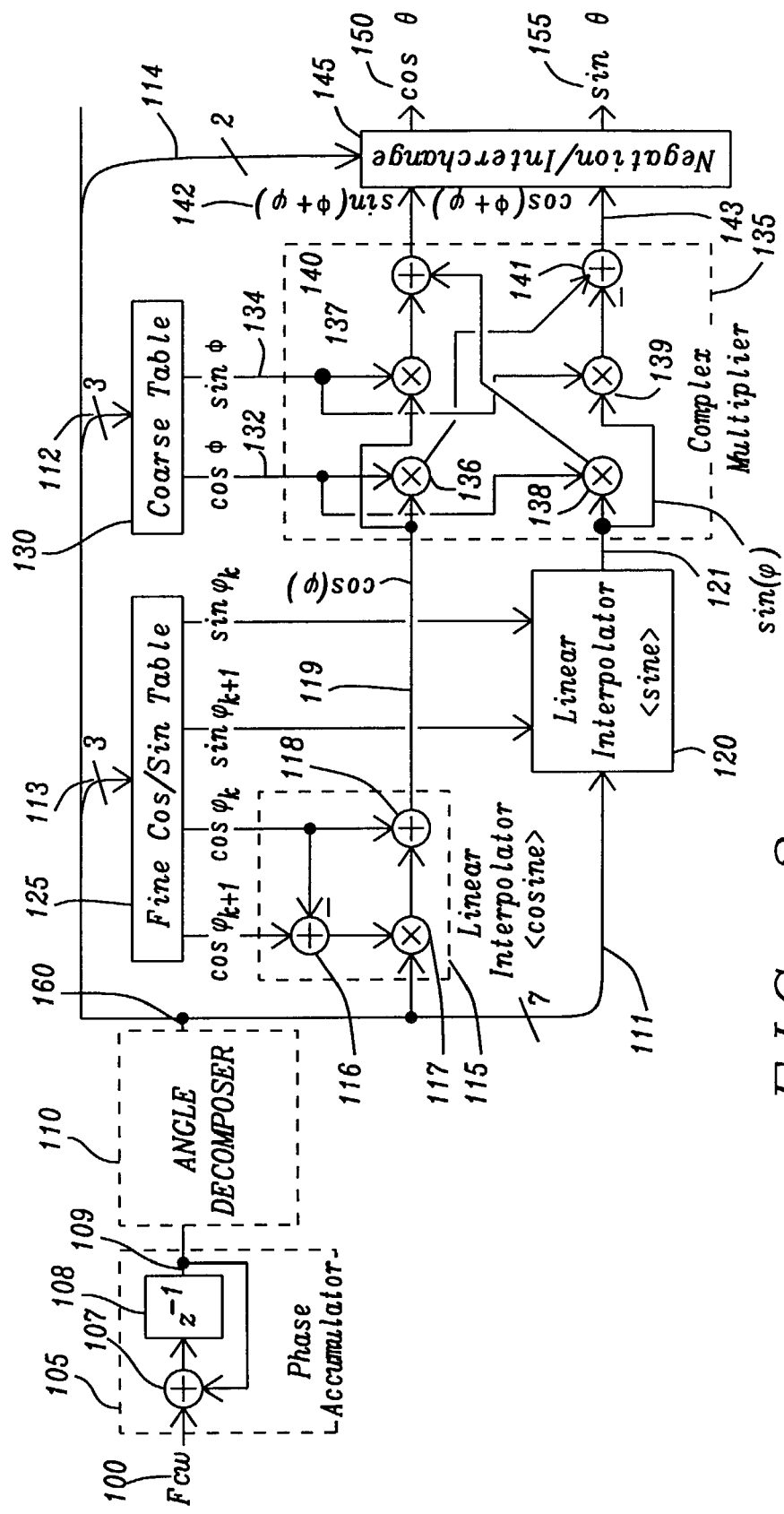
FIG. 3 is a functional block diagram of the trigonometric function generator of the direct digital frequency synthesizer of this invention.

Refer now to FIG. 3 for an explanation of the preferred embodiment of the trigonometric function generator of this invention. The frequency control word 100 is applied to the phase accumulator 105. The frequency control word 100 is the digital signal representing the magnitude of the phase angle increment of the digital input word as describes in FIG. 1d and is the integer ratio of a reference clock (not shown) and the desired output frequency. The phase accumulator 105 has an adder 107 and a phase register 108. The adder 107 sums the frequency control word 100 with the current phase magnitude signal 109 from the phase register 108 to generate a next phase magnitude. At each cycle of the reference clock the current phase magnitude signal 109 changes to the next phase magnitude. Since the phase magnitude signal 109 is in fact an address, which in the classical direct synthesizer of the prior art would be an address of the ROM, the phase magnitude is normalized such that the range of the addresses of the current phase magnitude 100 is normalized to represent the phases from zero radians (0°) to 2π (360°) radians.

In an implementation of the preferred embodiment, the phase accumulator 105 is a 32 bit phase accumulator. The 32 bit phase accumulator is used to generate the phase from the input frequency control word 100. The 32 bit accumulator allows a frequency tuning resolution of Fclk/$2^{32}$, where Fclk is the reference clock. Equivalently, the output frequency can thus be controlled to a resolution less than 0.001 ppm. The 32 b adder is partitioned into two 16 b carry-select adder sections. Each 16 b adder is designed as a Brent-Kung-structured carry-look-ahead adder, and the 16 b addition is completed in 1.8 nsec in 0.35 μm CMOS technology. The output of the phase accumulator is truncated to 15 b.

The current phase magnitude 100 as truncated by the phase accumulator 105 is transferred to the angle decomposition circuit 110. The angle decomposition circuit 110 creates the sub-angles of the phase angle θ, which in the preferred embodiment are represented as described above by the formula:

$$\theta = \alpha + \Phi + \phi$$

The phase angle magnitude signal 109 is a binary number having $2^N$ (N being the number of binary digits of the binary number) possible numbers representing the possible phase angles from zero radians (0°) to 2π (360°) radians. The phase decomposition circuit 110 is essentially a router that chooses particular signals of the phase angle magnitude 109 for routing. The quadrant selection (α) is determined by the two most significant bits 114 of the decomposed phase magnitude signal 160. The three next most significant bits 112 indicate the coarse increments Φ of the phase angle and the following next most significant three bits 113 indicate the fine increments $\phi_k$ within each of the coarse increments Φ. The fractional portion $$\left(\frac{\delta}{\pi/128}\right)$$

of the smallest sub-angle φ ($\phi_k$+δ) between the smaller fine increment $\phi_k$ and the next larger fine increment $\phi_{k+1}$ is determined by the least significant seven bits 111 of the decomposed phase angle 160.

The second three of the lessor significant bits 113 are the address inputs to the sine/cosine table 125 containing the sine and cosine values for the fine increments (π/16) between the coarse increments. The sine and cosine values the smaller fine increment $\phi_k$ and the next larger fine increment $\phi_{k+1}$ are the inputs to the linear cosine interpolator 115 and the linear sine interpolator 120. The least significant seven bits 111 indicating the fractional portion $$\left(\frac{\delta}{\pi/128}\right)$$

of the smallest sub-angle φ ($\phi_k$+δ) between the smaller fine increment $\phi_k$ and the next larger fine increment $\phi_{k+1}$ is a second input to the linear cosine interpolator 115 and the linear sine interpolator 120.

The structure for the linear cosine interpolator 115 and the linear sine interpolator 120 are identical and are explained for the linear cosine interpolator 115 only. The linear cosine interpolator 115 has a difference circuit 116 to find the difference in value the cosine of the smaller fine increment $\phi_k$ and the value cosine of the next larger fine increment $\phi_{k+1}$. This difference is an input to the multiplier 117 and is multiplied by the fractional portion fractional portion $$\left(\frac{\delta}{\pi/128}\right)$$

as indicated by the least significant seven bits 111. This provides the interpolated value of the cosine of the small difference angle δ that is to be added to the value of the cosine of the smaller fine increment $\phi_k$. The adder 118 provides the addition function for the addition of the interpolated value δ to the value of the cosine of the smaller fine increment $\phi_k$.

The structure of the sine linear interpolator 120 similarly determines the difference between the values of the sine of the smaller fine increment $\phi_k$ and the value cosine of the next larger fine increment $\phi_{k+1}$. This difference is then multiplier by the fractional portion portion fractional portion $$\left(\frac{\delta}{\pi/128}\right)$$

as indicated by the least significant seven bits 111 to provide the interpolated value of the sine of the small difference angle δ. The small difference angle δ then added to the value of the cosine of the smaller fine increment $\phi_k$ to produce the value of the sine of the smallest sub-angle φ.

The three bits 112 indicating the coarse sub-angle Φ are the input to the coarse sine/cosine lookup table 130. The coarse sine/cosine lookup table 130 contains the sine and cosine values for each of the coarse increments (π/16) from 0 to π/2 radians (0-90°). The signals 121 and 119 representing respectively the sine and cosine values of the interpolated fine angle φ and the signals 132 and 134 representing the sine and cosine values of the coarse angle Φ are the inputs to the complex multiplier 135. The complex multiplier 135 provides the combination of the sine and cosine values of the coarse sub-angle Φ and the interpolated fine sub-angle φ to for the signals 142 and 143 representing values of the sine and cosine of the sum of the coarse sub-angle Φ and the interpolated fine sub-angle φ, as described above.

The complex multiplier 135 has the multiplier 136 that multiplies the signal representing the cosine of the interpolated fine sub-angle φ and the signal representing the cosine of the coarse sub-angle Φ to form the signal representing the direct cosine product. The multiplier 138 multiples the signal representing the sine of the interpolated fine sub-angle φ and the signal representing the sine of the coarse sub-angle Φ to form the signal representing the direct sine products. The multiplier 137 multiplies the signal representing the cosine of the interpolated fine sub-angle φ and the signal representing the sine of the coarse sub-angle Φ to form the signal representing the cross product. Similarly, the multiplier 139 multiplies the signal representing the cosine of the interpolated fine sub-angle φ and the signal representing the cosine of the coarse sub-angle Φ to form the cross product. The adder 140 adds the signal representing the direct product of the cosine of the interpolated fine sub-angle φ and the signal representing the cosine of the coarse sub-angle Φ and the signal representing the cross product of the multiple the signal representing the cosine of the interpolated fine sub-angle φ and the signal representing the sine of the coarse sub-angle Φ. The adder 140 forms the signal 142 representing sine of the sum of the interpolated fine sub-angle φ and the coarse sub-angle Φ. The adder 141 adds the signal representing the direct product of the sine of the interpolated fine sub-angle φ and the signal representing the sine of the coarse sub-angle Φ and the signal representing the cross product of the multiple the signal representing the sine of the interpolated fine sub-angle φ and the signal representing the cosine of the coarse sub-angle Φ. The adder 141 forms the signal 143 representing cosine of the sum of the interpolated fine sub-angle φ and the coarse sub-angle Φ.

The symmetry of the sine function and the cosine function allows the sine and cosines of the sum of the interpolated fine sub-angle φ and the coarse sub-angle Φ to be interchanged or negated by the negation and interchange circuit 145. The negation or interchange is dependent upon the trigonometric identities and is addressed according to the quadrant address 114 of the most significant bits of the decomposed normalized phase angle. The output signals 150 and 155 of the negation and interchange circuit 145 represent respectively the amplitude of the cosine and the sine of the phase angle θ indicated by the phase accumulator 105.

The output signals 150 and 155 representing respectively the amplitude of the cosine and the sine of the phase angle θ are then the input to the digital-to-analog converters 75b and 75a of FIG. 1d. As described above the digital-to-analog converters 75b and 75a changes the signal representing the amplitude of the cosine and sine of the phase angle θ to a voltage amplitude. The output of the digital-to-analog converters 75b and 75a are the inputs to the low pass filters 80b and 80a which filter any unwanted noise from the synthesized frequency as described above to create the synthesized quadrature signals 90 and 85.

The fine cosine and sine lookup table 125 and the coarse cosine and sine lookup table 130 are, in the preferred embodiment, implemented as memory cells such as static random access memory or read only memory (ROM). Further, it is apparent to one skilled in the art that the circuit functions as shown maybe implemented in digital signal computing processor. The circuit functions as shown would be a program process for generation of the signals representing the amplitudes for the sine and cosine functions of the generated phase angles. The program process would be programming code executable by the computing processor. The program code maybe obtained from media such as storage nodes of the cluster network or the global communication network in communication with the digital signal computing processor, or stored on storage media such a read only memory (ROM), or a magnetic disk.

Figure 4:
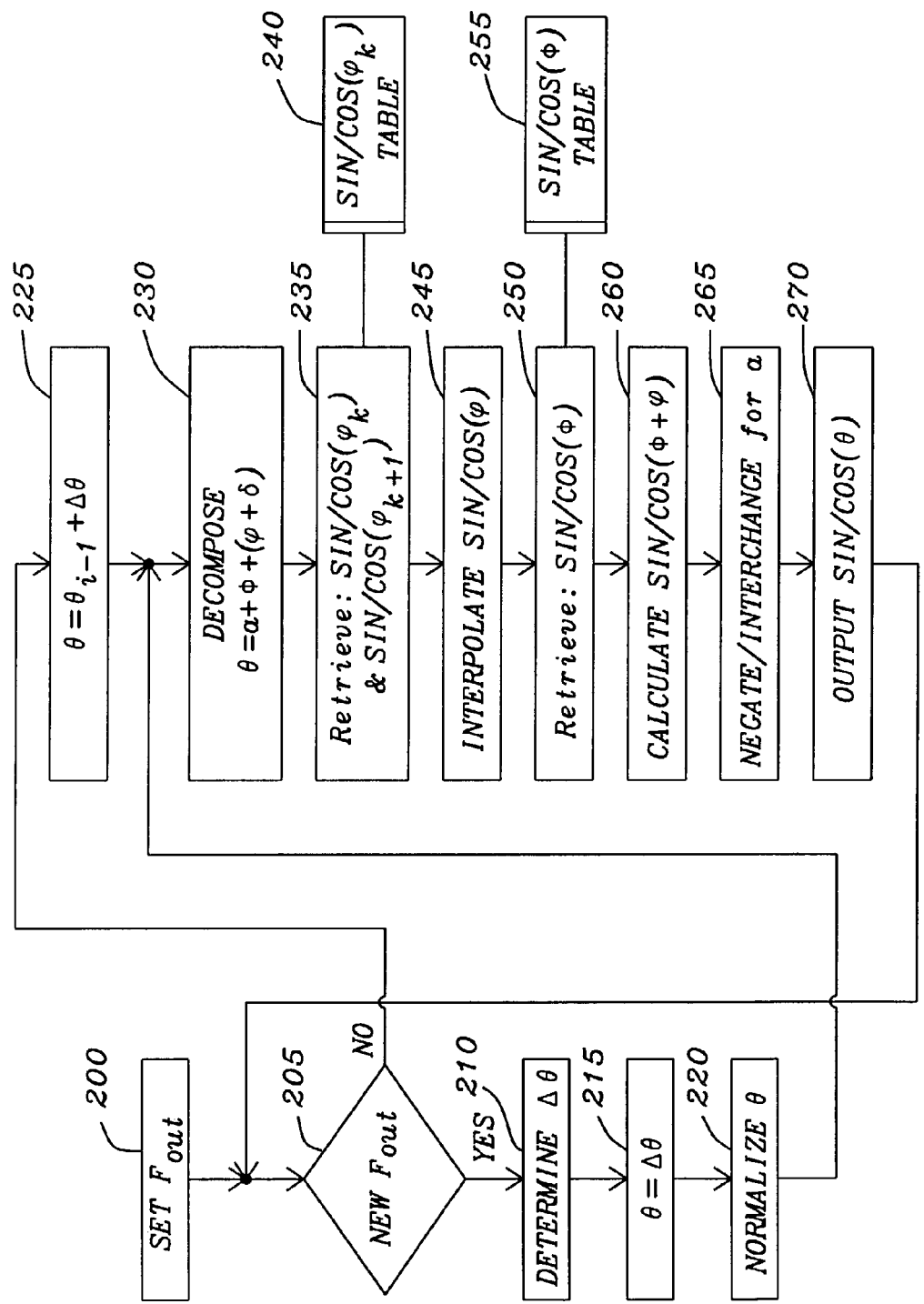
FIG. 4 is a flow diagram illustrating the method for synthesis of a frequency employing the trigonometric function generation of this invention.

Refer now to FIG. 4 for a discussion of the program process of this invention that would be implemented as program code for a digital signal computing system. The desired output frequency $F_{out}$ is set (Box 200) and upon querying (Box 205) if the set output frequency is a new frequency and if it is a new frequency, the phase interval (Δθ) is determined ((Box 210) according to the formula:

$$\Delta\theta = 2\pi * \frac{F_{CLK}}{F_{OUT}}$$

Where:
  Δθ is the phase interval for the desired frequency for the given reference clock.
  $F_{OUT}$=the output frequency of the direct digital synthesizer
  $F_{clk}$=the internal reference clock frequency (system clock)
  The value of the phase interval (Δθ) is stored digitally in an accumulator register of the digital signal computing system and the sensitivity of the tuning of the frequency synthesizer is dependent on the number of bits of the accumulator register. The first phase angle (θ) is set (Box 215) to the value of the phase interval (Δθ) and is normalized (Box 220) such that the address space available for the phase angles (θ) represents all the phase angles given the resolution of the accumulator register.

The phase angle (θ) is decomposed (Box 230) into the sub-angles, which in the preferred embodiment are represented as described above by the formula:

θ=α+Φ+φ

The phase angle is represented in the accumulator register as a binary number having $2^N$ (N being the number of binary digits of the binary number) possible numbers representing the possible phase angles from zero radians (0°) to 2π (360°) radians. The quadrant selection (α) is determined by the two most significant bits of the decomposed phase resident in the accumulator register. The three next most significant bits indicate the coarse increments Φ of the phase angle and the following next most significant three bits 113 indicate the fine increments $\phi_k$ within each of the coarse increments Φ. The fractional portion $$\left(\frac{\delta}{\pi/128}\right)$$

of the smallest sub-angle φ ($\phi_k$+δ) between the smaller fine increment $\phi_k$ and the next larger fine increment $\phi_{k+1}$ is determined by the least significant seven bits of the decomposed phase angle (θ).

A table (Box 240) of the sine/cosines for the smallest increments $\phi_k$ of the coarse sub-angle Φ is maintained in a memory area of the digital signal processing computing system. The memory area containing the table (Box 240) is generally a read only memory of the computing system with the bits of the accumulator register representing the smallest increments $\phi_k$ acting as pointers to the memory. The sine and cosine of the angle increment $\phi_k$ smaller than the smallest sub-angle φ and the sine and cosine of the angle increment $\phi_{k+1}$ larger than the smallest sub-angle φ are retrieved (Box 235) from the table (Box 240) of sine/cosines of the smallest increments $\phi_k$. From the sine and cosine of the angle increment $\phi_k$ smaller than the smallest sub-angle φ and the sine and cosine of the angle increment $\phi_{k+1}$ larger than the smallest sub-angle φ, the sine and cosine of the smallest sub-angle φ is then interpolated (Box 245) as the proportion of the angle increment of the fractional portion $$\left(\frac{\delta}{\pi/128}\right)$$

of the smallest sub-angle φ ($\phi_k$+δ). The interpolation (Box 245) is accomplished according the formulas:

$$\sin\varphi = \sin\left(\frac{k\pi}{128}+\delta\right) = \sin\left(\frac{k\pi}{128}\right) + \frac{\delta}{\pi/128}\left(\sin\left(\frac{(k+1)\pi}{128}\right) - \sin\left(\frac{k\pi}{128}\right)\right)$$

$$\cos\varphi = \cos\left(\frac{k\pi}{128}+\delta\right) = \cos\left(\frac{k\pi}{128}\right) + \frac{\delta}{\pi/128}\left(\cos\left(\frac{(k+1)\pi}{128}\right) - \cos\left(\frac{k\pi}{128}\right)\right)$$

A table (Box 255) of the sine/cosines for the coarse increments Φ is maintained in a memory area of the digital signal processing computing system. The memory area containing the table (Box 255) is generally a read only memory of the computing system with the bits of the accumulator register representing the coarse sub-angle Φ acting as pointers to the memory area. The sine and cosine of the coarse increment indicated are retrieved from the table (Box 255) of the sine/cosines. The sine and cosine of the sum of the coarse sub-angle Φ and the fine sub-angle φ are then calculated (Box 260) using complex multiplication of the sines and cosines of the coarse sub-angle Φ and the fine sub-angle φ. The complex multiplication is as the formula:

cos(Φ+φ)+j sin(Φ+φ)=(cos(Φ)+j sin(Φ))*(cos(φ)+j sin(φ))

thus sin(Φ+φ)=(cos(Φ)*sin(Φ))+(cos(φ)*sin(φ))

cos(Φ+φ)=(cos(Φ)*cos(Φ))−(sin(φ)*sin(φ))

The sine and cosine of the sums of the coarse sub-angle Φ and the fine sub-angle φ are then negated and/or interchanged (Box 265) dependent upon the quadrant of the angle θ as indicated by the sub-angle α. The sine and cosine functions are then converted and output (Box 270) as an analog signal. The frequency control word is queried (Box 205) to determine if a new frequency is specified. If no new frequency is specified, the phase angle is incremented (Box 225) and the next sine and cosine for the phase angle is created as described in (Boxes 230 through 270).

Figure 5:
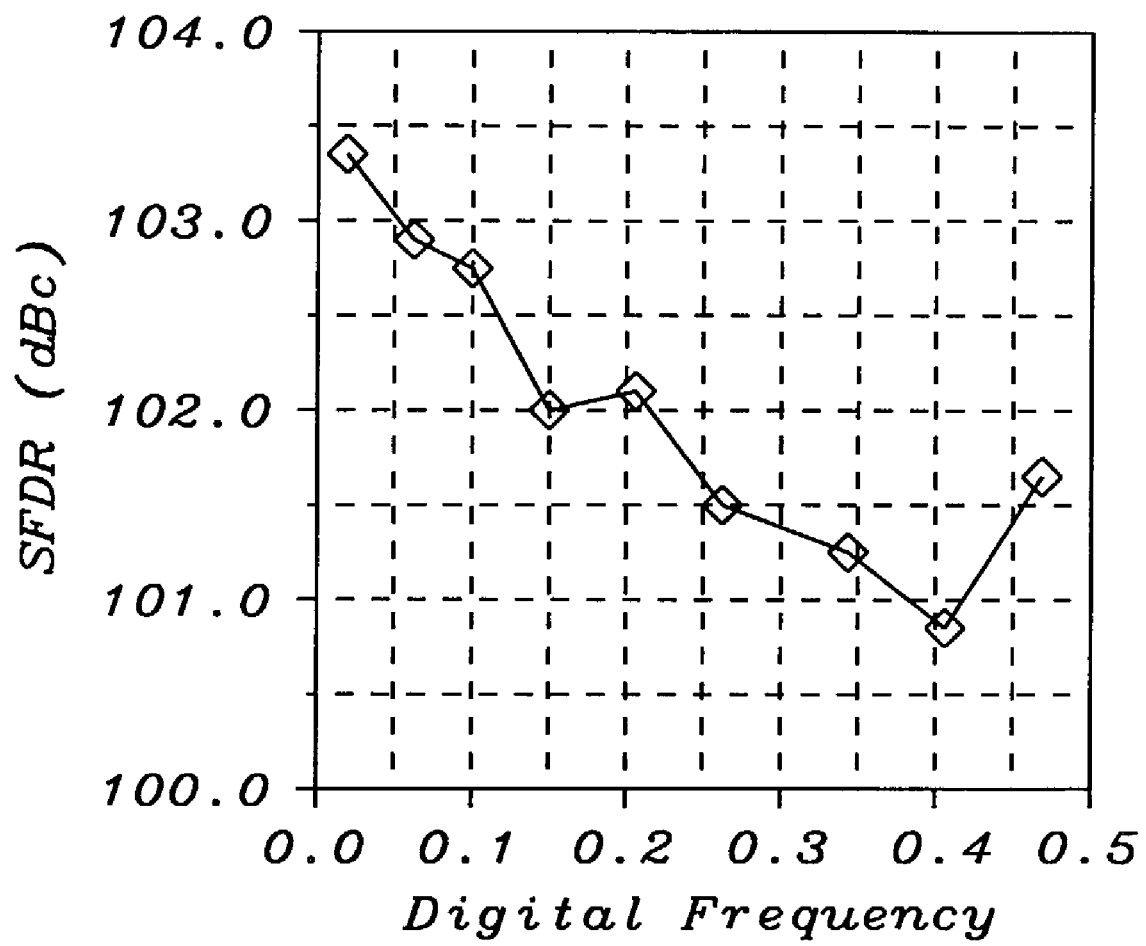
FIG. 5 is a plot of spurious frequency free dynamic range versus the output frequency as a ratio of the timing frequency of this invention.

Refer now to FIG. 5 for a discussion of the performance of an implementation of the direct digital frequency synthesizer of this invention. This implementation is fabricated in 0.35 μm CMOS and works at the sampling rate of 250 MHz. The output bandwidth of the implementation, which is generally defined as Fclk/3, reaches approximately 83 MHz. The 32 bit frequency control word Fcw gives the frequency tuning resolution of 0.06 Hz at 250 MHz sampling rate. The frequency switching latency is 10 clock cycles due to the pipelined structure. The plot of FIG. 5 illustrates the digital frequency as a fraction of the clock reference frequency versus the spurious-free dynamic range (SFDR). The direct digital frequency synthesizer of this invention provides a digital output spectrum, for the output frequency near 0.1 fclk, where the spurious-free dynamic range is greater than 100 dBc. As can be seen, the spurious-free dynamic range performance for other output frequencies from approaching 0*Fclk to approximately 0.5*Fclk is also greater than 100 dBc. To obtain such performance by using the lookup table, a ROM table of 14 b×214 words is necessary. As is shown above for this invention, the table requires only sixteen words for each trigonometric function (sine or cosine).

While this invention has been particularly shown and described with reference to the preferred embodiments thereof, it will be understood by those skilled in the art that various changes in form and details may be made without departing from the spirit and scope of the invention.

The invention claimed is:

1. A trigonometric function generator to provide at least one output signal, each output signal representing one of a plurality of trigonometric functions in response to an input signal indicating an angle, said trigonometric function generator comprising:
   an angle decomposing circuit connected for receiving said input signal to separate said input signal into a plurality of decomposition signals representing sub-angles of said angle, a sum of said sub-angles equaling said angle;
   an interpolation circuit in communication with said angle decomposing circuit to receive one of said decomposition signals representing a smallest of said sub-angles for generating the trigonometric function signals representing the plurality of trigonometric functions for said smallest of said sub-angles by interpolating between the trigonometric functions of two known angles;
   a first angle trigonometric retaining circuit in communication with the interpolation circuit and the angle decomposing circuit for retaining the trigonometric functions of said known angles to communicate a first trigonometric function signal representing the trigonometric functions for said two known angles to said interpolation circuit, the angle decomposing circuit providing a first indicating signal selecting said two known angles and said two known angles being an adjacent larger known angle and an adjacent smaller known angle;

at least one second angle trigonometric retaining circuit, each second angle trigonometric retaining circuit in communication with the angle decomposing circuit for retaining the trigonometric functions of for one of the sub-angles to communicate a second trigonometric function signal representing the trigonometric functions for said sub-angle upon receipt of a second indicating signal from the angle decomposing circuit denoting said sub-angle; and a complex arithmetic unit for combining the first trigonometric function signal and the second trigonometric function signal of each of the second angle trigonometric retaining circuits to create the output signals.

2. The trigonometric function generator of claim 1 wherein the complex arithmetic unit comprises:

a complex multiplier to multiply the first and second function signals to form said output signal.

3. The trigonometric generator of claim 1 wherein the first and second trigonometric retaining circuit retains said trigonometric functions for a first quadrant of a unit circuit and the complex arithmetic unit comprises:

a negation circuit to negate a combination of the first and second trigonometric function signals to create said output signals to represent the trigonometric functions of said angle in a second, third and fourth quadrant of said unit circle; and an interchange circuit to interchange the combination of the first and second trigonometric function signals to create said output signals to represent the trigonometric function of said angle in the second, third, and fourth quadrants.

4. The trigonometric function generator of claim 1 wherein the trigonometric functions are sine and cosine functions and the output signals represent the sine function and a cosine function of said angle represented by said input signal.

5. The trigonometric function generator of claim 1 wherein the interpolation circuit comprises:

a fractional angle calculator to create a fraction signal representing a fraction of the interval between two known angles where said smallest of said sub-angles resides;

a difference calculator connected to receive the trigonometric function signal for the two known angles to create a difference signal representing a difference for each trigonometric function of each of the two known angles;

a multiplier circuit connected to receive the difference signal and the fraction signal to create a product signal that is the multiplication of the difference signal and the fraction signal indicating a fractional portion of said trigonometric function of the smallest sub-angle in said interval of the two known angles; and a summation circuit connected to receive the trigonometric function signal of the least of the two known angles and the fraction signal to add said trigonometric signal of the least of the two known angles with said fraction signal to create the trigonometric function signal representing said trigonometric function for said smallest sub-angle.

6. A direct digital synthesizer for generating at least one output signal, each output signal representing one of a plurality of trigonometric functions in response to an input signal indicating a frequency of said output signal, said direct digital synthesizer comprising:

a phase accumulator connected to receive said input signal and a timing signal to generate an angle signal that is an angular sub-increment of the output signal, said angle signal being incremented by said input signal at each occurrence of said timing signal;

a trigonometric function generator in communication with the phase accumulator to receive the angle signal and from said angle signal creating at least one trigonometric function signal each trigonometric function signal representing one of said trigonometric functions, said trigonometric function generator comprising:

an angle decomposing circuit connected to receive the angle signal to separate said angle signal into a plurality of decomposition signals representing sub-angles of said angular sub-increment, a sum of said sub-angles equaling said angular sub-increment, an interpolation circuit in communication with said angle decomposing circuit to receive one of said decomposition signals representing a smallest of said sub-angles for generating the trigonometric function signals representing the plurality of trigonometric functions for said smallest of said sub-angles by interpolating between the trigonometric functions of two known angles, a first angle trigonometric retaining circuit in communication with the interpolation circuit and the angle decomposing circuit for retaining the trigonometric functions of said known angles to communicate a first trigonometric function signal representing the trigonometric functions for said two known angles to said interpolation circuit, the angle decomposing circuit providing a first indicating signal selecting said two known angles and said two known angles being an adjacent larger known angle and an adjacent smaller known angle, at least one second angle trigonometric retaining circuit, each second angle trigonometric retaining circuit in communication with the angle decomposing circuit for retaining the trigonometric functions of for one of the sub-angles to communicate a second trigonometric function signal representing the trigonometric functions for said sub-angle upon receipt of a second indicating signal from the angle decomposing circuit denoting said sub-angle, and a complex arithmetic unit for combining the first trigonometric function signal and the second trigonometric function signal of each of the second angle trigonometric retaining circuits to create the trigonometric function signals; and a digital-to-analog converter in communication with the trigonometric function generator to receive the trigonometric function signals to create said output signals.

7. The direct digital synthesizer of claim 6 further comprising a low pass filter in communication with the digital-to-analog converter to remove undesired noise signals from said output signal.

8. The direct digital synthesizer of claim 6 wherein the complex arithmetic unit comprises:

a complex multiplier to multiply the first and second function signals to form said output signal.

9. The direct digital synthesizer of claim 6 wherein the first and second trigonometric retaining circuit retains said trigonometric functions for a first quadrant of a unit circle and the complex arithmetic unit comprises:

a negation circuit to negate a combination of the first and second trigonometric function signals to create said output signals to represent the trigonometric functions of said angle in a second, third and fourth quadrant of said unit circle; and an interchange circuit to interchange the combination of the first and second trigonometric function signals to create said output signals to represent the trigonometric function of said angle in the second, third, and fourth quadrants.

10. The direct digital synthesizer of claim 6 wherein the trigonometric functions are sine and cosine functions and the output signals represent the sine function and a cosine function of said angle represented by said input signal.

11. The direct digital synthesizer of claim 6 wherein the interpolation circuit comprises:
   a fractional angle calculator to create a fraction signal representing a fraction of the interval between two known angles where said smallest of said sub-angles resides;
   a difference calculator connected to receive the trigonometric function signal for the two known angles to create a difference signal representing a difference for each trigonometric function of each of the two known angles;
   a multiplier circuit connected to receive the difference signal and the fraction signal to create a product signal that is the multiplication of the difference signal and the fraction signal indicating a fractional portion of said trigonometric function of the smallest sub-angle in said interval of the two known angles; and
   a summation circuit connected to receive the trigonometric function signal of the least of the two known angles and the fraction signal to add said trigonometric signal of the least of the two known angles with said fraction signal to create the trigonometric function signal representing said trigonometric function for said smallest sub-angle.

12. A sine/cosine function generator to provide at least one output signal, each output signal representing one of a plurality of sine/cosine functions in response to an input signal indicating an angle, said sine/cosine function generator comprising:
   an angle decomposing circuit connected for receiving said input signal to separate said input signal into a plurality of decomposition signals representing sub-angles of said angle, a sum of said sub-angles equaling said angle;
   an interpolation circuit in communication with said angle decomposing circuit to receive one of said decomposition signals representing a smallest of said sub-angles for generating the sine/cosine function signals representing the plurality of sine/cosine functions for said smallest of said sub-angles by interpolating between the sine/cosine functions of two known angles;
   a first angle sine/cosine retaining circuit in communication with the interpolation circuit and the angle decomposing circuit for retaining the sine/cosine functions of said known angles to communicate a first sine/cosine function signal representing the sine/cosine functions for said two known angles to said interpolation circuit, the angle decomposing circuit providing a first indicating signal selecting said two known angles and said two known angles being an adjacent larger known angle and an adjacent smaller known angle;
   at least one second angle sine/cosine retaining circuit, each second angle sine/cosine retaining circuit in communication with the angle decomposing circuit for retaining the sine/cosine functions of for one of the sub-angles to communicate a second sine/cosine function signal representing the sine/cosine functions for said sub-angle upon receipt of a second indicating signal from the angle decomposing circuit denoting said sub-angle; and
   a complex arithmetic unit for combining the first sine/cosine function signal and the second sine/cosine function signal of each of the second angle sine/cosine retaining circuits to create the output signals.

13. The sine/cosine function generator of claim 12 wherein the complex arithmetic unit comprises:
   a complex multiplier to multiply the first and second function signals to form said output signal.

14. The sine/cosine generator of claim 12 wherein the first and second sine/cosine retaining circuit retain said sine/cosine functions for a first quadrant of a unit circle and the complex arithmetic unit comprises:
   a negation circuit to negate a combination of the first and second sine/cosine function signals to create said output signals to represent the sine/cosine functions of said angle in a second, third and fourth quadrant of said unit circle; and
   an interchange circuit to interchange the combination of the first and second sine/cosine function signals to create said output signals to represent the sine/cosine function of said angle in the second, third, and fourth quadrants.

15. The sine/cosine function generator of claim 12 wherein the sine/cosine functions are sine and cosine functions and the output signals represent the sine function and a cosine function of said angle represented by said input signal.

16. The sine/cosine function generator of claim 12 wherein the interpolation circuit comprises:
   a fractional angle calculator to create a fraction signal representing a fraction of the interval between two known angles where said smallest of said sub-angles resides;
   a difference calculator connected to receive the sine/cosine function signal for the two known angles to create a difference signal representing a difference for each sine/cosine function of each of the two known angles;
   a multiplier circuit connected to receive the difference signal and the fraction signal to create a product signal that is the multiplication of the difference signal and the fraction signal indicating a fractional portion of said sine/cosine function of the smallest sub-angle in said interval of the two known angles; and
   a summation circuit connected to receive the sine/cosine function signal of the least of the two known angles and the fraction signal to add said sine/cosine signal of the least of the two known angles with said fraction signal to create the sine/cosine function signal representing said sine/cosine function for said smallest sub-angle.

17. A direct digital synthesizer for generating at least one output signal, each output signal representing one of a sine/cosine function in response to an input signal indicating a frequency of said output signal, said direct digital synthesizer comprising:
   a phase accumulator connected to receive said input signal and a timing signal to generate an angle signal that is an angular sub-increment of the output signal, said angle signal being incremented by said input signal at each occurrence of said timing signal;
   a sine/cosine function generator in communication with the phase accumulator to receive the angle signal and from said angle signal creating at least one sine/cosine function signal each sine/cosine function signal representing one of said sine/cosine functions, said sine/cosine function generator comprising:
      an angle decomposing circuit connected to receive the angle signal to separate said angle signal into a plurality of decomposition signals representing sub-angles of said angular sub-increment, a sum of said sub-angles equaling said angular sub-increment, an interpolation circuit in communication with said angle decomposing circuit to receive one of said decomposition signals representing a smallest of said sub-angles for generating the sine/cosine function signals representing the plurality of sine/cosine functions for said smallest of said sub-angles by interpolating between the sine/cosine functions of two known angles, a first angle sine/cosine retaining circuit in communication with the interpolation circuit and the angle decomposing circuit for retaining the sine/cosine functions of said known angles to communicate a first sine/cosine function signal representing the sine/cosine functions for said two known angles to said interpolation circuit, the angle decomposing circuit providing a first indicating signal selecting said two known angles and said two known angles being an adjacent larger known angle and an adjacent smaller known angle, at least one second angle sine/cosine retaining circuit, each second angle sine/cosine retaining circuit in communication with the angle decomposing circuit for retaining the sine/cosine functions of for one of the sub-angles to communicate a second sine/cosine function signal representing the sine/cosine functions for said sub-angle upon receipt of a second indicating signal from the angle decomposing circuit denoting said sub-angle, and a complex arithmetic unit for combining the first sine/cosine function signal and the second sine/cosine function signal of each of the second angle sine/cosine retaining circuits to create the sine/cosine function signals; and a digital-to-analog converter in communication with the sine/cosine function generator to receive the sine/cosine function signals to create said output signals.

18. The direct digital synthesizer of claim 17 further comprising a low pass filter in communication with the digital-to-analog converter to remove undesired noise signals from said output signal.

19. The direct digital synthesizer of claim 17 wherein the complex arithmetic unit comprises:
a complex multiplier to multiply the first and second function signals to form said output signal.

20. The direct digital synthesizer of claim 17 wherein the first and second sine/cosine retaining circuit retain said sine/cosine functions for a first quadrant of a unit circle and the complex arithmetic unit comprises:
a negation circuit to negate a combination of the first and second sine/cosine function signals to create said output signals to represent the sine/cosine functions of said angle in a second, third and fourth quadrant of said unit circle; and
an interchange circuit to interchange the combination of the first and second sine/cosine function signals to create said output signals to represent the sine/cosine function of said angle in the second, third, and fourth quadrants.

21. The direct digital synthesizer of claim 17 wherein the sine/cosine functions are sine and cosine functions and the output signals represent the sine function and a cosine function of said angle represented by said input signal.

22. The direct digital synthesizer of claim 17 wherein the interpolation circuit comprises:
a fractional angle calculator to create a fraction signal representing a fraction of the interval between two known angles where said smallest of said sub-angles resides;
a difference calculator connected to receive the sine/cosine function signal for the two known angles to create a difference signal representing a difference for each sine/cosine function of each of the two known angles;
a multiplier circuit connected to receive the difference signal and the fraction signal to create a product signal that is the multiplication of the difference signal and the fraction signal indicating a fractional portion of said sine/cosine function of the smallest sub-angle in said interval of the two known angles; and
a summation circuit connected to receive the sine/cosine function signal of the least of the two known angles and the fraction signal to add said sine/cosine signal of the least of the two known angles with said fraction signal to create the sine/cosine function signal representing said sine/cosine function for said smallest sub-angle.

23. A method for direct digital synthesis of at least one output signal representing a trigonometric function in response to an input indicating a repetition frequency of said output signal, said method comprising the steps of:
a) providing a timing frequency;
b) setting said input to a repetition frequency;
c) determining a frequency multiple, said frequency multiple being the ratio of said timing frequency to said repetition frequency;
d) determining a phase increment from said frequency multiple;
e) setting a phase accumulation counter to said phase increment, said phase accumulation register containing a phase angle for said output signal;
f) determining said plurality of trigonometric functions for said phase angle, said determining said trigonometric functions comprising the steps of:
decomposing said phase angle into a plurality of sub-angles of said phase angle, a sum of said sub-angles equaling said phase angle,
providing a plurality of trigonometric functions for each of a plurality of known angles,
selecting two known angles, said two known angles being an adjacent larger known angle and an adjacent smaller known angle of a smallest of said sub-angles,
interpolating the trigonometric functions between the trigonometric functions of the two known angles, and
combining the interpolated trigonometric functions of each of the smallest sub-angles with non-interpolated trigonometric functions of the sub-angles by complex arithmetic;
g) converting said trigonometric functions to said output signals;
h) incrementing said phase accumulation counter by said phase increment; and
i) executing steps e) through h) until a new timing frequency is provided.

24. The method of claim 23 further comprising the step of a low pass filtering said output signal to remove undesired noise signals.

25. The method of claim 23 wherein the complex arithmetic is complex multiplication.

26. The method of claim 23 wherein plurality of trigonometric functions for each of a plurality of known angles are for a first quadrant of a unit circle and the combining the trigonometric functions comprises the steps of:
negating a combination of the trigonometric function of the sub-angles to create the trigonometric functions of said angle if said angle is in a second, third and fourth quadrant of said unit circle, where said trigonometric functions of said angle in the second, third, and fourth quadrant of the unit circle are a negative of the trigonometric function of the first quadrant; and interchanging the combination of the trigonometric functions signals to create said output signals to represent the trigonometric function of said angle in the second, third, and fourth quadrants, where said trigonometric functions of said angle in the second, third, and fourth quadrant of the unit circle are a dual of the trigonometric function of the first quadrant.

27. The method of claim 23 wherein the trigonometric functions are sine and cosine functions and the output signals represent the sine function and a cosine function of said angle represented by said input signal.

28. The method of claim 23 wherein the interpolating comprises the steps of:
  calculating a fraction of the interval between two known angles where said smallest of said sub-angles resides;
  calculating a difference for each trigonometric function of each of the two known angles;
  multiplying the difference and the fraction to create a product indicating a fractional portion of said trigonometric function of the smallest sub-angle in said interval of the two known angles; and
  summing the trigonometric function of the least of the two known angles and the product to add said trigonometric signal of the least of the two known angles with said product to create the said trigonometric function for said smallest sub-angle.

29. An apparatus for direct digital synthesis of at least one output signal representing a trigonometric function in response to an input indicating a repetition frequency of said output signal, said apparatus comprising:
  a) means for providing a timing frequency;
  b) means for setting said input to a repetition frequency;
  c) means for determining a frequency multiple, said frequency multiple being the ratio of said timing frequency to said repetition frequency;
  d) means for determining a phase increment from said frequency multiple;
  e) means for setting a phase accumulation counter to said phase increment, said phase accumulation register containing a phase angle for said output signal;
  f) means for determining said plurality of trigonometric functions for said phase angle, comprising:
    means for decomposing said phase angle into a plurality of sub-angles of said phase angle, a sum of said sub-angles equaling said phase angle,
    means for providing a plurality of trigonometric functions for each of a plurality of known angles,
    means for selecting two known angles, said two known angles being an adjacent larger known angle and an adjacent smaller known angle of a smallest of said sub-angles,
    means for interpolating the trigonometric functions between the trigonometric functions of the two known angles, and
    means for combining interpolated trigonometric functions of each of the smallest sub-angles with non-interpolated trigonometric of said sub-angles by complex arithmetic;
  g) means for converting said trigonometric functions to said output signals;
  h) means for incrementing said phase accumulation counter by said phase increment; and
  i) means for repeatedly executing the means of e) through h) until the means for providing a new timing frequency provides said new timing frequency.

30. The apparatus of claim 29 further comprising means for low pass filtering said output signal to remove undesired noise signals.

31. The apparatus of claim 29 wherein the complex arithmetic is complex multiplication.

32. The apparatus of claim 29 wherein plurality of trigonometric functions for each of a plurality of known angles are for a first quadrant of a unit circle and the means for combining the trigonometric functions comprises:
  means for negating a combination of the trigonometric function of the sub-angles to create the trigonometric functions of said angle if said angle is in a second, third and fourth quadrant of said unit circle, where said trigonometric functions of said angle in the second, third, and fourth quadrant of the unit circle are a negative of the trigonometric function of the first quadrant; and
  means for interchanging the combination of the trigonometric functions signals to create said output signals to represent the trigonometric function of said angle in the second, third, and fourth quadrants, where said trigonometric functions of said angle in the second, third, and fourth quadrant of the unit circle are a dual of the trigonometric function of the first quadrant.

33. The apparatus of claim 32 wherein the trigonometric functions are sine and cosine functions and the output signals represent the sine function and a cosine function of said angle represented by said input signal.

34. The apparatus of claim 32 wherein the means for interpolating comprises:
  means for calculating a fraction of the interval between two known angles where said smallest of said sub-angles resides;
  means for calculating a difference for each trigonometric function of each of the two known angles;
  means for multiplying the difference and the fraction to create a product indicating a fractional portion of said trigonometric function of the smallest sub-angle in said interval of the two known angles; and
  means for summing the trigonometric function of the least of the two known angles and the product to add said trigonometric signal of the least of the two known angles with said product to create the said trigonometric function for said smallest sub-angle.

35. A digital signal computing system for direct digital synthesis of at least one output signal representing a trigonometric function in response to an input indicating a repetition frequency of said output signal, said digital signal computing system comprising:
  a data retention device for retaining a plurality of trigonometric functions for each of a plurality of known angles;
  a program retention device for retaining program instruction code
  a program execution unit in communication with said program retention device and said data retention device for receiving and executing said program instruction code, said program instruction code executing the steps of:
    a) providing a timing frequency;
    b) setting said input to a repetition frequency;
    c) determining a frequency multiple, said frequency multiple being the ratio of said timing frequency to said repetition frequency;
    d) determining a phase increment from said frequency multiple;
    e) setting a phase accumulation counter to said phase increment, said phase accumulation register containing a phase angle for said output signal;

f) determining said plurality of trigonometric functions for said phase angle, comprising the steps of:
  decomposing said phase angle into a plurality of sub-angles of said phase angle, a sum of said sub-angles equaling said phase angle,
  providing a plurality of trigonometric functions for each of a plurality of known angles,
  selecting two known angles, said two known angles being an adjacent larger known angle and an adjacent smaller known angle of a smallest of said sub-angles,
  interpolating the trigonometric functions between the trigonometric functions of the two known angles, and
  combining interpolated trigonometric functions of each of the smallest sub-angles with non-interpolated trigonometric functions of said sub-angles by complex arithmetic;
g) converting said trigonometric functions to said output signals;
h) incrementing said phase accumulation counter by said phase increment; and
i) repeating steps e) through h) until a new timing frequency is provided.

36. The digital signal computing system of claim 35 wherein said program instruction code further comprises the step of a low pass filtering said output signal to remove undesired noise signals.

37. The digital signal computing system of claim 35 wherein the complex arithmetic is complex multiplication.

38. The digital signal computing system of claim 35 wherein plurality of trigonometric functions for each of a plurality of known angles are for a first quadrant of a unit circle and the combining the trigonometric functions comprises the steps of:
  negating a combination of the trigonometric function of the sub-angles to create the trigonometric functions of said angle if said angle is in a second, third and fourth quadrant of said unit circle, where said trigonometric functions of said angle in the second, third, and fourth quadrant of the unit circle are a negative of the trigonometric function of the first quadrant; and
  interchanging the combination of the trigonometric functions signals to create said output signals to represent the trigonometric function of said angle in the second, third, and fourth quadrants, where said trigonometric functions of said angle in the second, third, and fourth quadrant of the unit circle are a dual of the trigonometric function of the first quadrant.

39. The digital signal computing system of claim 35 wherein the trigonometric functions are sine and cosine functions and the output signals represent the sine function and a cosine function of said angle represented by said input signal.

40. The digital signal computing system of claim 35 wherein the interpolating comprises the steps of:
  calculating a fraction of the interval between two known angles where said smallest of said sub-angles resides;
  calculating a difference for each trigonometric function of each of the two known angles;
  multiplying the difference and the fraction to create a product indicating a fractional portion of said trigonometric function of the smallest sub-angle in said interval of the two known angles; and
  summing the trigonometric function of the least of the two known angles and the product to add said trigonometric signal of the least of the two known angles with said product to create the said trigonometric function for said smallest sub-angle.

41. A computer readable medium containing program instruction code readable by and executable on a digital signal computing system for direct digital synthesis of at least one output signal representing a trigonometric function in response to an input signal indicating a repetition frequency of said output signal, said program instruction code comprising the steps of:
  a) providing a timing frequency;
  b) setting said input to a repetition frequency;
  c) determining a frequency multiple, said frequency multiple being the ratio of said timing frequency to said repetition frequency;
  d) determining a phase increment from said frequency multiple;
  e) setting a phase accumulation counter to said phase increment, said phase accumulation register containing a phase angle for said output signal;
  f) determining said plurality of trigonometric functions for said phase angle, comprising the steps of:
    decomposing said phase angle into a plurality of sub-angles of said phase angle, a sum of said sub-angles equaling said phase angle,
    providing a plurality of trigonometric functions for each of a plurality of known angles,
    selecting two known angles, said two known angles being an adjacent larger known angle and an adjacent smaller known angle of a smallest of said sub-angles,
    interpolating the trigonometric functions between the trigonometric functions of the two known angles, and
    combining interpolated trigonometric functions of each of the smallest sub-angles with non-interpolated trigonometric functions of said sub-angles by complex arithmetic;
  g) converting said interpolated trigonometric functions to said output signals;
  h) incrementing said phase accumulation counter by said phase increment; and
  i) repeating steps e) through h) until a new timing frequency is provided.

42. The computer readable medium of claim 41 wherein said program instruction code further comprises the step of a low pass filtering said output signal to remove undesired noise signals.

43. The computer readable medium of claim 41 wherein the complex arithmetic is complex multiplication.

44. The computer readable medium of claim 41 wherein plurality of trigonometric functions for each of a plurality of known angles are for a first quadrant of a unit circle and the combining the trigonometric functions comprises the steps of:
  negating a combination of the trigonometric function of the sub-angles to create the trigonometric functions of said angle if said angle is in a second, third and fourth quadrant of said unit circle, where said trigonometric functions of said angle in the second, third, and fourth quadrant of the unit circle are a negative of the trigonometric function of the first quadrant; and
  interchanging the combination of the trigonometric functions signals to create said output signals to represent the trigonometric function of said angle in the second, third, and fourth quadrants, where said trigonometric functions of said angle in the second, third, and fourth quadrant of the unit circle are a dual of the trigonometric function of the first quadrant.

45. The computer readable medium of claim 41 wherein the trigonometric functions are sine and cosine functions and the output signals represent the sine function and a cosine function of said angle represented by said input signal.

46. The computer readable medium of claim 41 wherein the interpolating comprises the steps of:

calculating a fraction of the interval between two known angles where said smallest of said sub-angles resides;

calculating a difference for each trigonometric function of each of the two known angles;

multiplying the difference and the fraction to create a product indicating a fractional portion of said trigonometric function of the smallest sub-angle in said interval of the two known angles; and summing the trigonometric function of the least of the two known angles and the product to add said trigonometric signal of the least of the two known angles with said product to create the said trigonometric function for said smallest sub-angle.

* * * * *